(12) United States Patent
Badreddine et al.

(10) Patent No.: US 11,691,616 B2
(45) Date of Patent: Jul. 4, 2023

(54) POWERTRAIN TORQUE CONTROL METHOD AND SYSTEM

(71) Applicant: Ford Global Technologies, LLC, Dearborn, MI (US)

(72) Inventors: Bader Badreddine, Dearborn Heights, MI (US); Susan Rebecca Cikanek, Northville, MI (US); Matthew Allan Herrmann, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 388 days.

(21) Appl. No.: 17/007,266

(22) Filed: Aug. 31, 2020

(65) Prior Publication Data

US 2022/0063592 A1    Mar. 3, 2022

(51) Int. Cl.
*B60W 20/30* (2016.01)
*B60W 20/10* (2016.01)

(52) U.S. Cl.
CPC .......... *B60W 20/30* (2013.01); *B60W 20/10* (2013.01); *B60W 2510/083* (2013.01); *B60W 2510/105* (2013.01)

(58) Field of Classification Search
CPC ................ B60W 20/30; B60W 20/10; B60W 2510/083; B60W 2510/105

USPC ........................................................ 701/22
See application file for complete search history.

(56) References Cited

U.S. PATENT DOCUMENTS

| 8,545,368 | B1 * | 10/2013 | Davis ................. B60W 10/184 477/92 |
| 2015/0134168 | A1 | 5/2015 | Kawakami et al. |
| 2018/0297465 | A1 * | 10/2018 | Miyaishi ................ F16H 61/36 |
| 2019/0382015 | A1 | 12/2019 | Niu et al. |
| 2020/0166128 | A1 | 5/2020 | Komuro |
| 2021/0053487 | A1 * | 2/2021 | Vangelov ............... B60K 35/00 |

FOREIGN PATENT DOCUMENTS

JP        2019132198 A  *  8/2019

* cited by examiner

*Primary Examiner* — Isaac G Smith
(74) *Attorney, Agent, or Firm* — David Kelley; McCoy Russell LLP

(57) ABSTRACT

Methods and systems are provided for improving torque control of a vehicle that includes simulated shifting of a step gear ratio transmission. In one example, a propulsive effort request is gradually incrementally increased or decreased to provide a smooth torque transition, thereby providing a smoother vehicle speed change and improve vehicle drivability.

19 Claims, 5 Drawing Sheets

POWERTRAIN TORQUE CONTROL METHOD AND SYSTEM

FIELD

The present description relates generally to methods and systems for controlling torque that is delivered to propel a vehicle.

BACKGROUND/SUMMARY

A propulsive effort request may be a basis for delivering torque to vehicle wheels. The propulsive effort request may be determined from a propulsive effort pedal. The propulsive effort pedal may be applied to increase wheel torque, thereby increasing vehicle speed. Further, the propulsive effort pedal may be released to reduce wheel torque, thereby reducing vehicle speed. An operator of a vehicle may expect a vehicle speed to increase or decrease based on a position of the propulsive effort pedal. However, the propulsive effort request that may be a basis for increasing or decreasing powertrain torque or power may be influenced via inputs or sources that do not include the position of the propulsive effort pedal. Consequently, it may be possible for the vehicle operator to experience a vehicle speed change that deviates from what is expected by the operator.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
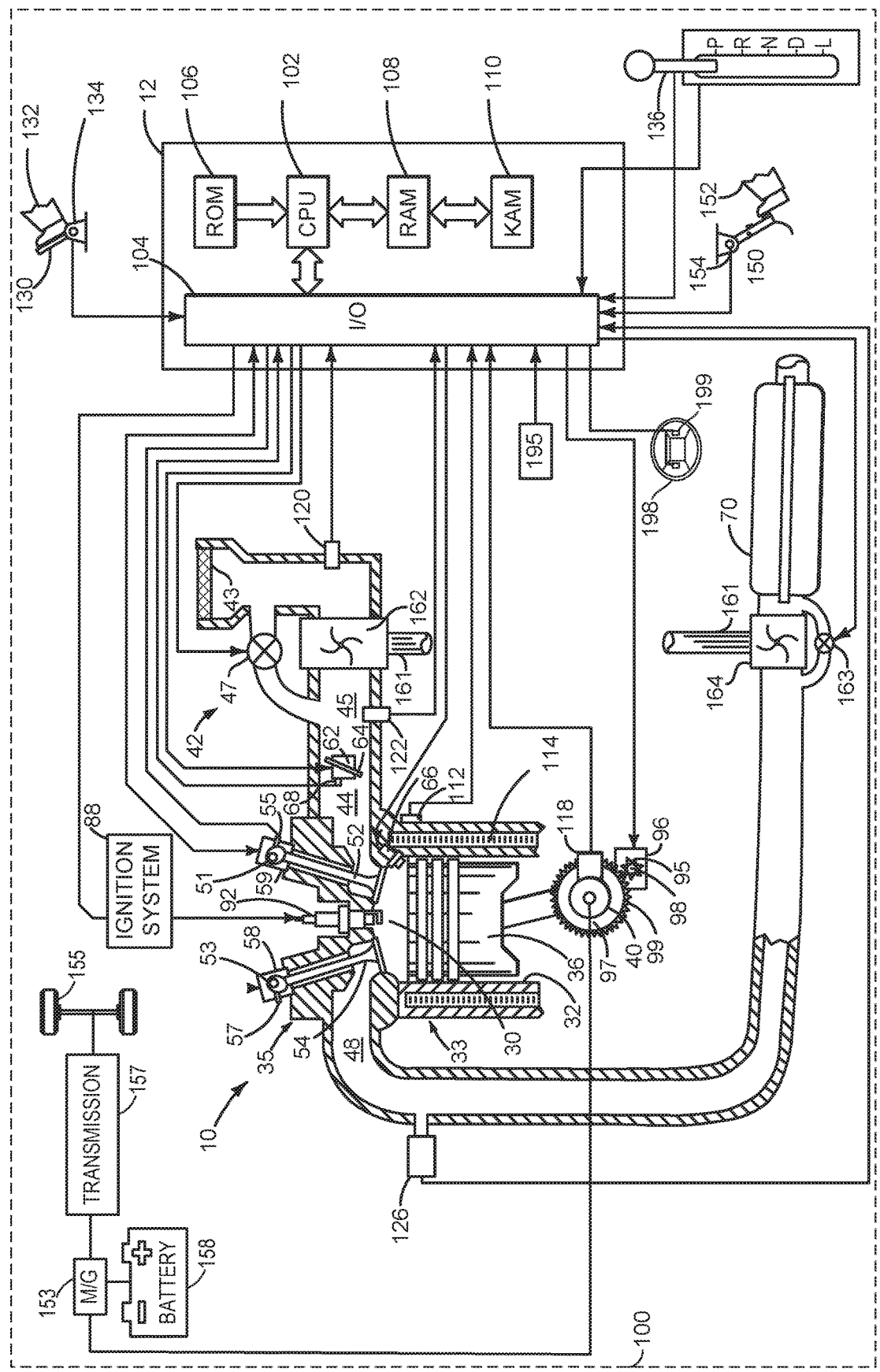
FIG. 1 is a schematic diagram of an engine system coupled in a hybrid vehicle system.
Figure 2:
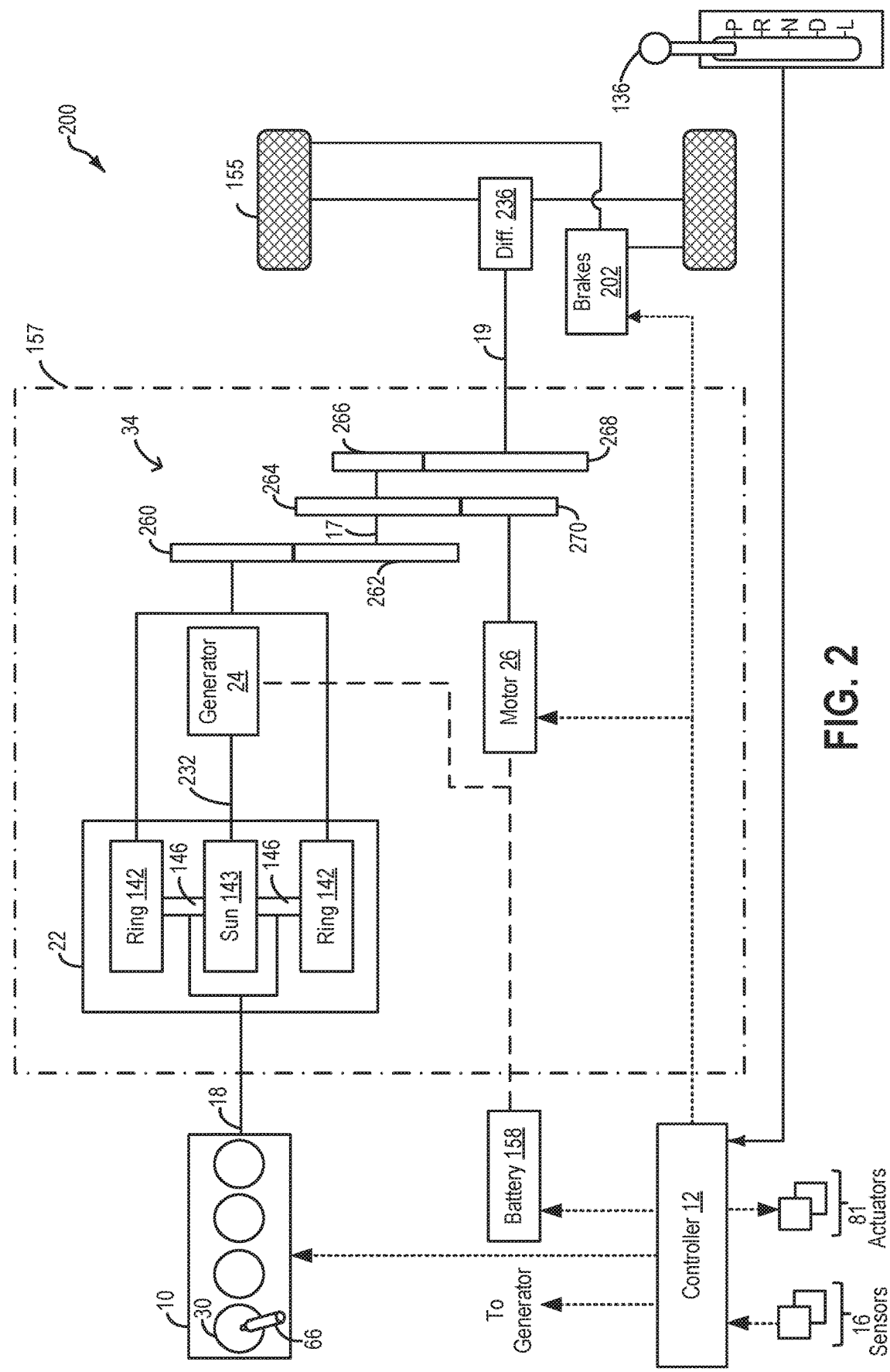
FIG. 2 shows an example powertrain of a hybrid vehicle system.
Figure 3:
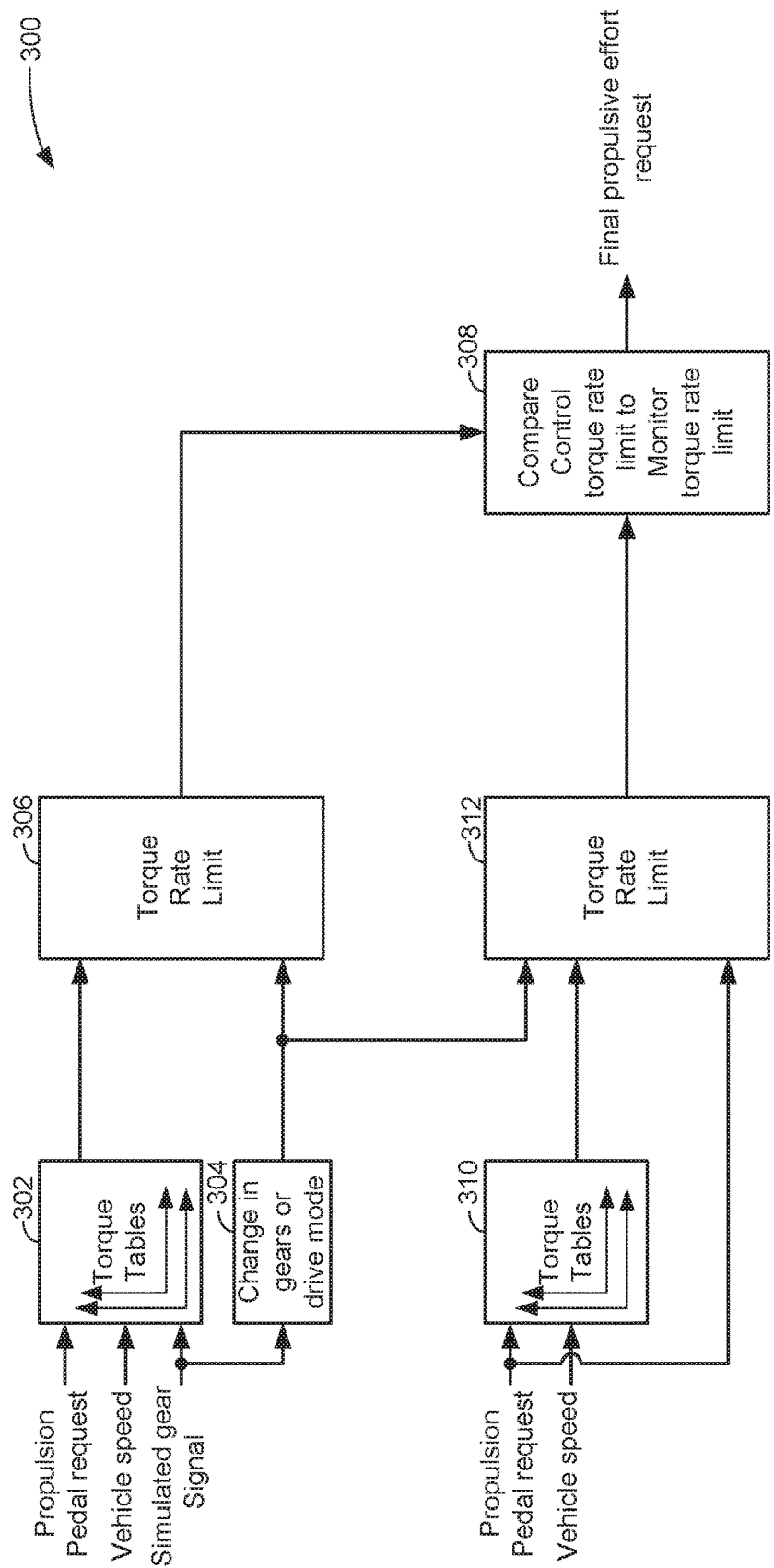
FIG. 3 shows a high level block diagram of a powertrain torque controller.
Figure 4:
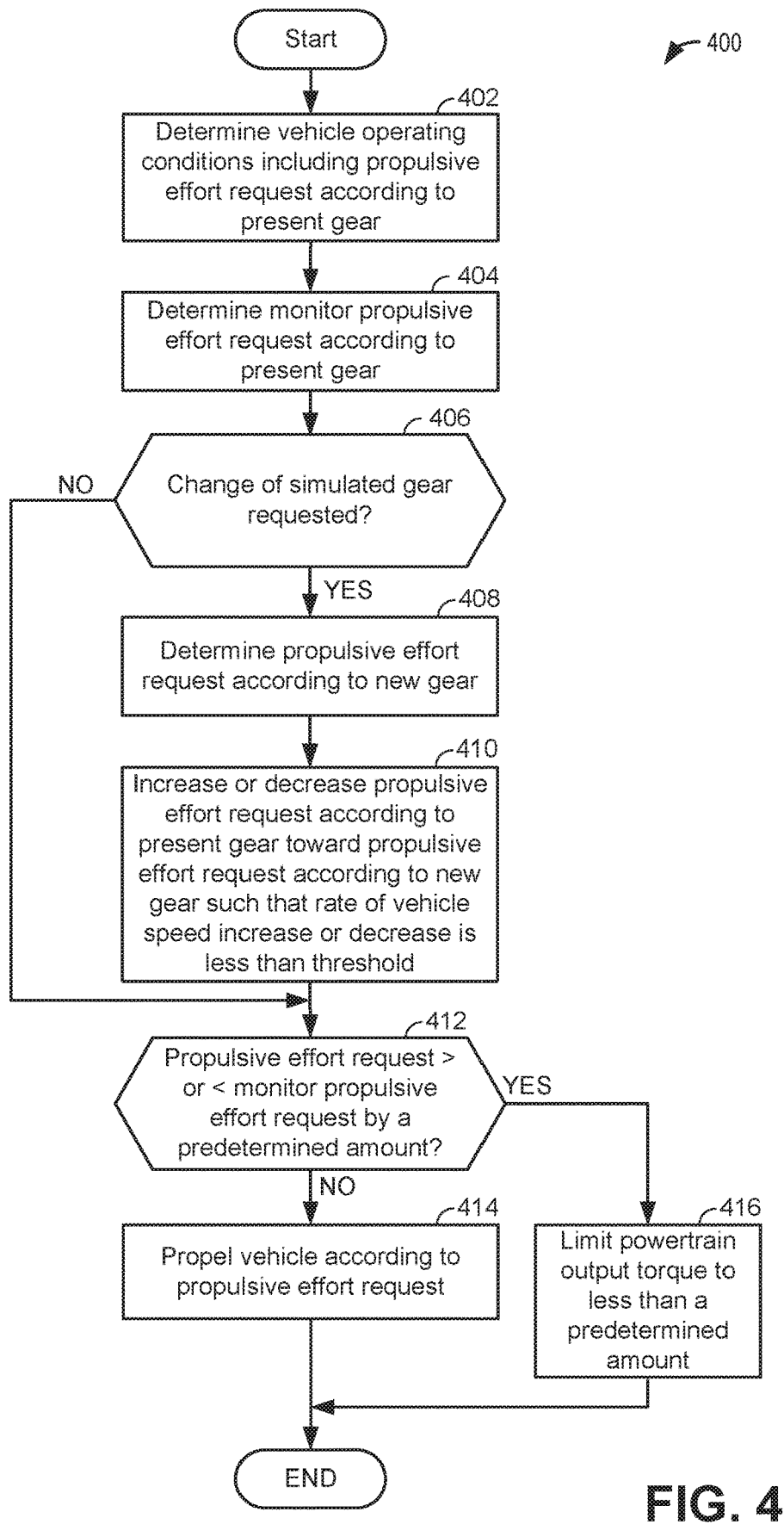
FIG. 4 shows a high level flowchart of an example method for controlling powertrain torque or power.
Figure 5:
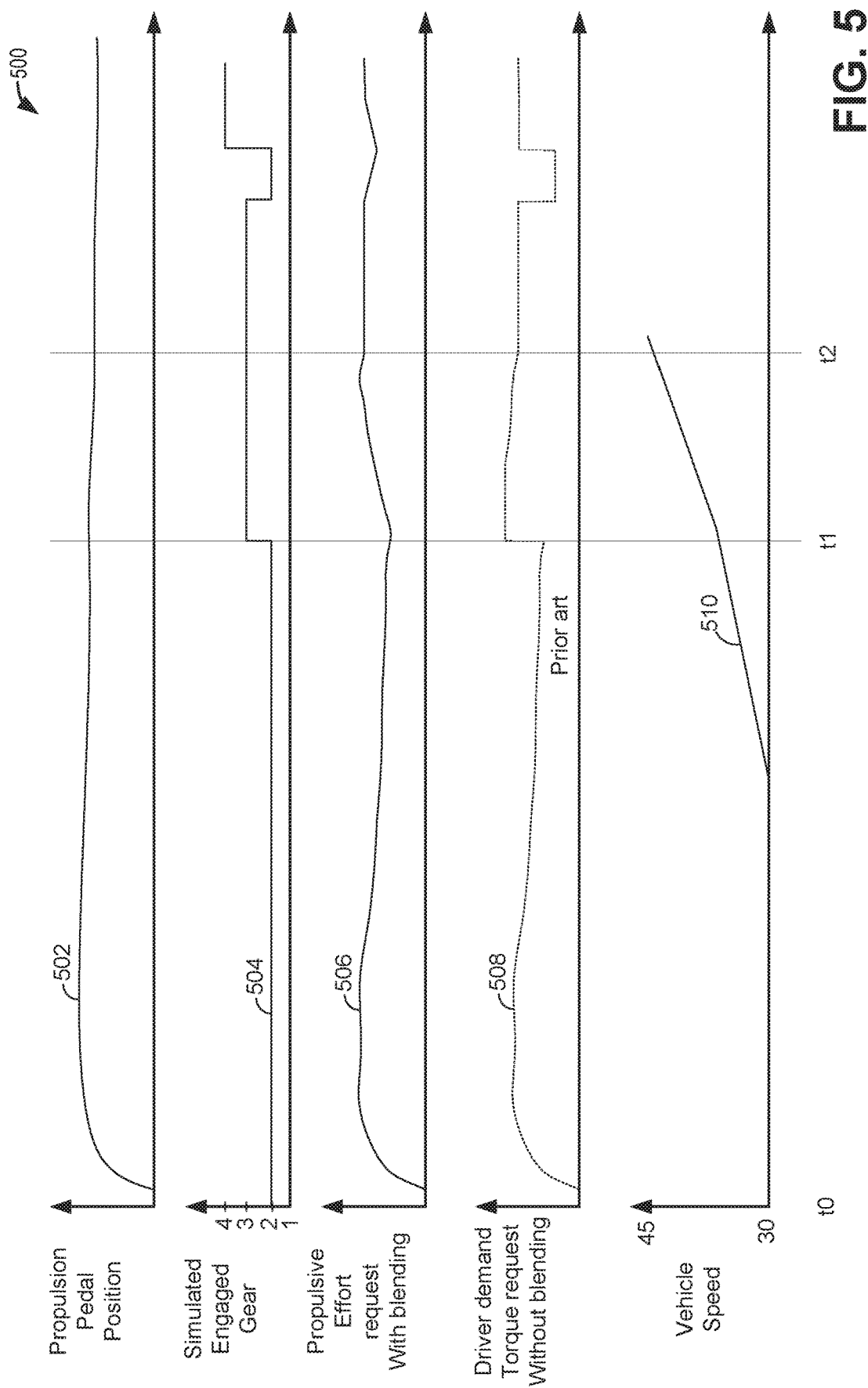
FIG. 5 shows a prophetic example sequence for controlling powertrain torque output.

The following description relates to systems and methods for controlling torque that is delivered via a powertrain. The powertrain may include an internal combustion engine as shown in FIG. 1. The powertrain may be configured as shown in FIG. 2, and it may include one or more electric machines. A block diagram showing how a propulsive effort request may be generated is shown in FIG. 3. A method for adjusting a propulsive effort request is shown in FIG. 4. Finally, an example sequence where simulated gears are changed and a propulsive effort request is controlled is shown in FIG. 5.

A hybrid vehicle may include a continuously variable transmission that does not include stepped gear ratios that are selectively engaged and disengaged via clutches. Rather, torque may be delivered through a planetary gear set that includes several different output paths. Consequently, the continuously variable transmission does not engage gears via clutches. However, some vehicle operators prefer a feeling of transmission gears shifting. The continuously variable transmission may emulate transmission gear shifting via commanding a powertrain to provide different torque output levels according to simulated gear ratios and vehicle speed. The powertrain output torque amounts may be determined via a plurality of maps that may be referenced via vehicle speed and simulated gear number. However, switching between the plurality of torque maps to simulate transmission gear shifts may cause abrupt changes in a propulsive effort request (e.g., a driver demand wheel torque or power) and changes in vehicle speed that may be outside of an expected range.

The inventors herein have recognized the previously mentioned issue and have developed a method for operating a vehicle, comprising: simulating gear shifting of a step gear ratio transmission in a powertrain that includes a continuously variable transmission and that does not include stepped gear ratios; and adjusting a propulsive effort request to change from a first value to a second value via a plurality of incremental changes while a propulsive effort pedal position is substantially constant in response to the simulated gear shifting.

By gradually increasing the propulsive effort request to change from a first value to a second value, it may be possible to provide the technical result of smooth torque production and vehicle speed changes that are within an expected range. In addition, the propulsive effort request may be compared against a monitor propulsive effort request to ensure that the propulsive effort request provides vehicle speed changes that may be within an expected range.

The present approach provides for several advantages. In particular, the approach provides for smooth vehicle speed changes after a simulated gear ratio change. Further, the approach may provide for vehicle speed changes that are within an expected range. In addition, the approach may improve vehicle drivability.

Referring to FIG. 1, an internal combustion engine 10 is shown. Engine 10 may be included in a drivetrain of a vehicle 100 configured for on-road propulsion, such as the powertrain of FIG. 2. In one example, vehicle 100 is a hybrid electric vehicle. However, vehicle 100 may be an electric vehicle or a conventional vehicle that includes only an internal combustion engine as a source of propulsive effort.

Engine 10 comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. An optional starter 96 (e.g., low voltage (operated with less than 30 volts) electric machine) is included for cranking the engine during an engine start. The starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain to initiate engine rotation during an engine start. Once a threshold engine speed is reached, the starter may be decoupled from the engine and thereafter engine rotation is maintained via fuel combustion in engine cylinders. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In further embodiments, fuel may be delivered into an intake port of cylinder 30, upstream of intake valve 52, to provide port injection of fuel. In still further embodiments, a portion of cylinder fuel may be delivered via direct injection while a remaining portion is delivered via port injection. The different injectors may deliver the same fuel or fuel of different properties, such as a gasoline fuel and an ethanol fuel.

Intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve (CRV) 47 may be selectively adjusted to a plurality of positions between fully open and fully closed. Adjusting the opening of CRV 47 allows boosted intake air to be selectively recirculated to upstream of the compressor so as to decrease the pressure in boost chamber 45. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an propulsive effort pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. The propulsive effort pedal and brake pedal may be combined for example in a pivoting setup to select either increasing vehicle speed or decreasing vehicle speed. Further, the propulsive effort pedal may be combined with the transmission direction selection for example, joystick control. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive operator input via a transmission lever or gear shift selector 136. Selector 136 may be manually shifted between different gear options by the vehicle operator based on a desired transmission output and a desired direction of vehicle motion. In one example, as depicted, the operator may have the following operator selectable options: park (P), reverse (R), neutral (N), drive (D), and low (L). In the depicted example, the shift selector is known as a PRNDL lever, corresponding to the different options. In one example, when in park or neutral, substantially no torque may be transmitted from the engine to the transmission output. When in park, the vehicle is immobile. In drive, an electronic controller can control the transmission to select any available forward gear ratios, enabling the vehicle to move in a forward direction. In reverse, a single reverse gear is selected, enabling the vehicle to move in a backward or reverse direction. In low, only a lower set of forward gear ratios can be selected by the electronic controller. In some examples, there may be a low 1 and low 2 option. Shift selector 136 may be located on a steering column or between driver and passenger seats of the vehicle. In addition, in some examples, the transmission may not include fixed gear ratios. Rather, the transmission may include a planetary gear set. Nevertheless, gears may be simulated in such a system via maps that control powertrain output torque or power. Manual selection of forward gears may be permitted via paddle shifters 199. Paddle shifters 199 may be coupled to steering wheel 198.

The controller 12 receives signals from the various sensors of FIG. 1 and employs the various actuators of FIG. 1, such as throttle 62, fuel injector 66, spark plug 91, etc., to adjust engine operation based on the received signals and instructions stored on a memory of the controller. As one example, the controller may send a pulse width signal to the fuel injector to adjust an amount of fuel delivered to a cylinder. Further, controller 12 may receive input from a human operator or vehicle passenger via human/machine interface 195. Human/machine interface may be a touch screen, touch panel, key switch, or other known input device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In some examples, vehicle 100 may be a hybrid vehicle with multiple sources of torque available to one or more vehicle wheels 155. In other examples, vehicle 100 is a conventional vehicle with only an internal combustion engine, or an electric vehicle with only electric machine(s). In the example shown, vehicle 100 includes engine 10 and an electric machine 153. Electric machine 153 may be a motor or a motor/generator. Crankshaft 40 of engine 10 and electric machine 153 are connected via a transmission 157 to vehicle wheels 155. In the depicted example, a first clutch 156 is provided between crankshaft 40 and electric machine 153. Electric machine 153 is shown directly coupled to transmission 157. Controller 12 may send a signal to an actuator of each clutch 156 to engage or disengage the clutch, so as to connect or disconnect crankshaft 40 from electric machine 153 and the components connected thereto, and/or connect or disconnect electric machine 153 from transmission 157 and the components connected thereto. In other examples, clutches need not be included. Transmission 157 may be a gearbox, a planetary gear system, or another type of transmission. The powertrain may be configured in various manners including as a parallel, a series, or a series-parallel hybrid vehicle.

Electric machine 153 receives electrical power from a traction battery 158 to provide torque to vehicle wheels 155. Electric machine 153 may also be operated as a generator to provide electrical power to charge battery 158, for example during a braking operation.

FIG. 2 depicts a hybrid propulsion system or powertrain 200 for a vehicle. In the depicted embodiment, the vehicle is a hybrid electric vehicle (HEV), such as vehicle 100 of FIG. 1. Propulsion system 200 includes an internal combustion engine 10 (such as engine 10 of FIG. 1) having a plurality of cylinders 30. Fuel may be provided to each cylinder of engine 10 from a fuel system (not shown) including one or more fuel tanks, one or more fuel pumps, and injectors 66.

Engine 10 delivers power to transmission 157 via torque input shaft 18. In the depicted example, transmission 157 is a power-split transmission (or transaxle) that includes a planetary gearset 22 and one or more rotating gear elements. Transmission 157 further includes an electric generator 24 and an electric motor 26. The electric generator 24 and the electric motor 26 may also be referred to as electric machines as each may operate as either a motor or a generator. Torque is output from transmission 157, for propelling vehicle tractions wheels 155, via a power transfer gearing 34, a torque output shaft 19, and differential-and-axle assembly 236.

Generator 24 is drivably connected to electric motor 26 such that each of electric generator 24 and electric motor 26 may be operated using electric energy from an electrical energy storage device, herein depicted as battery 158. In some embodiments, an energy conversion device, such as an inverter, may be coupled between the battery and the motor to convert the DC output of the battery into an AC output for use by motor. However, in alternate embodiments, the inverter may be configured in the electric motor. Due to the mechanical properties of the planetary gearset, generator 24 may be driven by a power output element (on an output side) of the planetary gearset 22 via mechanical connection 232, as further elaborated below.

Electric motor 26 may be operated in a regenerative mode, that is, as a generator, to absorb energy from vehicle motion and/or the engine and convert the absorbed kinetic energy to an energy form suitable for storage in battery 158 Furthermore, electric motor 26 may be operated as a motor or generator, as required, to augment or absorb torque provided by the engine, such as during a transition of engine 10 between different combustion modes (e.g., during transitions between a spark ignition mode and a compression ignition mode).

Planetary gearset 22 comprises a ring gear 142, a sun gear 143, and a planetary carrier assembly 146. The ring gear and sun gear may be coupled to each other via the carrier. A first input side of planetary gearset 22 is coupled to engine 10 while a second input side of the planetary gearset 22 is coupled to the generator 24. An output side of the planetary gearset is coupled to vehicle traction wheels 155 via power transfer gearing 34 including one or more meshing gear elements 260-268. In one example, the meshing gear elements 260-268 may be step ratio gears wherein carrier assembly 46 may distribute torque to the step ratio gears. The step ratio gears may include, for example, a neutral gear, a reverse gear, and one or more forward gears. Gear elements 262, 264, and 266 are mounted on a countershaft 17 with gear element 264 engaging an electric motor-driven gear element 270. Electric motor 26 drives gear element 270, which acts as a torque input for the countershaft gearing. In this way, the planetary carrier 146 (and consequently the engine and generator) may be coupled to the vehicle wheels and the motor via one or more gear elements. An operator may select a transmission gear via actuation of gear shift selector 136, as discussed at FIG. 1.

Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event.

For example, the vehicle may be driven in a first engine-on mode, herein also referred to as an "engine" mode, wherein engine 10 is operated in conjunction with the electric generator (which provides reaction torque to the planetary gear-set and allows a net planetary output torque for propulsion) and used as the primary source of torque for powering wheels 155 (the generator may also be providing torque to wheels if in motoring mode). During the "engine" mode, fuel may be supplied to engine 10 from a fuel tank via fuel injector 66 so that the engine can spin fueled to provide the torque for propelling the vehicle. Specifically, engine power is delivered to the ring gear of the planetary gearset. Coincidentally, the generator provides torque to the sun gear 143, producing a reaction torque to the engine. Consequently, torque is output by the planetary carrier to gears 262, 264, 266 on countershaft 17, which in turn delivers the power to wheels 155. Optionally, the engine can be operated to output more torque than is needed for propulsion, in which case the additional power is absorbed by the generator (in generating mode) to charge the battery 158 or supply electrical power for other vehicle loads.

In another example, the vehicle may be driven in a second engine-on mode, herein also referred to as an "assist" mode. During the assist mode, engine 10 is operated and used as the primary source of torque for powering wheels 155 and the electric motor is used as an additional torque source to act in cooperation with, and supplement the torque provided by, engine 10. During the "assist" mode, as in the engine-only mode, fuel is supplied to engine 10 so as to spin the engine fueled and provide torque to the vehicle wheels.

In still another example, the vehicle may be driven in an engine-off mode, herein also referred to as an electric-only mode, wherein battery-powered electric motor 26 is operated and used as the only source of torque for driving wheels 155. As such, during the engine-off mode, no fuel may be injected into engine 10 irrespective of whether the engine is spinning or not. The "engine-off" mode may be employed, for example, during braking, low speeds, while stopped at traffic lights, etc. Specifically, motor power is delivered to gear element 270, which in turn drives the gear elements on countershaft 17, and thereon drives wheels 155.

Propulsion system 200 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. Input may also be received via the shift selector 136, a brake pedal, a propulsive effort pedal, a vehicle speed sensor, and the other sensors of FIG. 1. The various actuators may include, for example, the gear set, cylinder fuel injectors (not shown), an air intake throttle coupled to the engine intake manifold (not shown), and the actuators of FIG. 1. Controller 12 may receive input data from the various sensors, process the input data, and trigger the actuators in response to the processed input data based on instruction or code programmed therein corresponding to one or more control routines. Example control routines are described herein with regard to FIGS. 4-7.

For example, a frictional force may be applied to wheels 155 by engaging friction wheel brakes 202. In one example, friction wheel brakes 202 may be engaged in response to the driver pressing their foot on a brake pedal (not shown). A brake control module of the controller 12 may adjust the brake torque applied to the wheels via the wheel brakes in concert with an engine brake torque from engine 10 and/or a motor brake torque from motor 26 in order to apply a net amount of brake torque on the wheels that decelerates the vehicle's reverse motion at a target rate of deceleration. In the same way, the frictional force may be reduced to wheels 155 by disengaging wheel brakes 202 in response to the driver releasing their foot from a brake pedal, or the vehicle reverse speed falling below a threshold. As a further example, vehicle brakes may apply a frictional force to wheels 155 as part of an automated engine stopping procedure, and release the frictional force as part of an engine restart procedure. It will be appreciated that in further embodiments, operator controls that combine brake, accelerator, and vehicle direction selection may be combined into a joystick-like control.

The system of FIGS. 1 and 2 provide for a vehicle system, comprising: an engine; a continuously variable transmission coupled to the engine; a gear selector; and a controller with computer readable instructions stored on non-transitory memory that when executed cause the controller to: gradually change a propulsive effort request from a first value to a second value while a propulsive effort pedal position is substantially constant, the first value based on a powertrain simulating engagement of a first transmission gear, the second value based on the powertrain simulating engagement of a second transmission gear. The system includes where the first transmission gear is based on a position of the gear selector, and where the second transmission gear is based on a position of the gear selector. The system includes where gradually changing the propulsive effort request includes increasing the propulsive effort request at less than a predetermined rate. The system includes where gradually changing the propulsive effort request includes decreasing the propulsive effort request at less than a predetermined rate. The system further comprises one or more paddle shift levers. The system includes where the powertrain simulates shifting from the first transmission gear to the second transmission gear based on input to the one or more paddle shift levers. The system includes where gradually changing the propulsive effort request includes incrementally adjusting the propulsive effort request.

Turning now to FIG. 3, an example control block diagram 300 for determining a propulsive effort request (e.g., a driver demand wheel torque or power) is shown. Portions, or the entire control block diagram 300, may be incorporated into or may cooperate with the method of FIG. 4 and the system of FIGS. 1 and 2.

Propulsion effort pedal position, vehicle speed, and simulated gear signal are applied to reference a plurality of tables 302 for emulating shifting of a step gear ratio transmission and adjusting a propulsive effort request via a powertrain that includes a continuously variable transmission without a step gear ratios that may be selectively engaged and disengaged via one or more clutches. One table may be provided for each simulated transmission gear ratio and a propulsive effort request is output from a table that provides a propulsive effort request for simulating a gear ratio at a beginning of a simulated gear shift (e.g., a presently engaged simulated gear). Another table included in the plurality of tables may provide a propulsive effort request for simulating a gear ratio at an end of a simulated gear shift (e.g., a new gear). The plurality of tables 302 output only one propulsive effort request and the propulsive effort request is rate limited at 306.

Similarly, propulsion effort pedal position and vehicle speed are applied to reference one or more tables 310 for adjusting a monitor propulsive effort request. The plurality of tables 310 output only one monitor propulsive effort request and the monitor propulsive effort request may be output to and rate limited at 312.

The propulsive effort request output from tables 302 may be rate limited at 306 such that the propulsive effort request incrementally increases at a predetermined rate. In one example, the rate limit may be implemented via the following:

if $(R\_PPTR(i-1)-PPTR(i))>$threshold, then $R\_PPTR(i)=R\_PPTR(i-1)+$inc else $R\_PPTR(i)=PPTR(i)$ where R_PPTR is the rate limited propulsive effort request, i is the data sample number, PPTR is the propulsive effort request, inc is an incremental increase or decrease value, and threshold is a predetermined rate limit threshold. Thus, if $(R\_PPTR(i-1)-PPTR(i))>$threshold, then $R\_PPTR(i)=R\_PPTR(i-1)+$inc, otherwise, $R\_PPTR(i)=PPTR(i)$. Of course, the propulsive effort request may be rate limited in other known ways. The monitor propulsive effort request may be rate limited in a similar way at 312. The output of 306 and the output of 312 are input to block 308.

At block 308, it may be determined if the rate limited propulsive effort request is greater than the rate limited monitor propulsive effort request by more than a predetermined amount or if the rate limited propulsive effort request is less than the rate limited monitor propulsive effort request by more than a predetermined amount. If so, block 308 outputs a limited propulsive effort request (e.g., a propulsive effort request that is equal to or less than a creep torque, where the creep torque is a powertrain output torque that causes a vehicle to move at less than a threshold velocity on a road having zero grade). If not, block 308 outputs the rate limited propulsive effort request as the propulsive effort request. The powertrain is commanded to generate torque or power that is equivalent to the propulsive effort request output from block 308.

In this way, a propulsive effort request that is generated via a propulsive effort pedal may be controlled during a simulated transmission gear shift or during a vehicle mode change. By limiting a rate of increase or decrease of the propulsive effort request, increases or decreases in vehicle speed may be managed.

Referring now to FIG. 4, a high level flow chart of an example method 400 for determining and controlling a propulsive effort request is shown. The propulsive effort request may be a basis for adjusting engine and electric machine torque so that a powertrain torque or power or a wheel torque or power may be provided via the vehicle powertrain. The method of FIG. 4 may be included in the system of FIGS. 1 and 2 as executable instructions. In addition, method 400 may include actions taken in the physical world by the controller to adjust vehicle operation. The method of FIG. 4 may be executed when a propulsive effort pedal position is substantially constant (e.g., changing by less than 5% of full scale during a predetermined time interval, such as one second).

At 402, method 400 determines vehicle operating conditions. Vehicle operating conditions may include vehicle speed, engine speed, ambient temperature, ambient pressure, engine load, and a position of a propulsive effort pedal. The position of the propulsive effort pedal may be converted into a propulsive effort request by referencing one or more tables that output a propulsive effort request when the table or function is referenced via propulsive effort pedal position, presently selected simulated transmission gear, and vehicle speed as previously described for FIG. 3. The various vehicle operating conditions may be determined from the various sensors described herein. Method 400 proceeds to 404.

At 404, method 400 determines a monitor propulsive effort request. The monitor propulsive effort request may also be determined via referencing one or more tables that output a monitor propulsive effort request. The one or more tables may be referenced via propulsive effort pedal position, vehicle speed, and presently selected simulated transmission gear. Method 400 proceeds to 406.

At 406, method 400 judges if a change in the selected simulated transmission gear is presently being requested. Method 400 may judge that a change in the selected simulated transmission gear is being requested if a position of a shift lever changes or if a position of a paddle shift lever changes. If method 400 judges that there is a request to change to a new simulated transmission gear, the answer is yes and method 400 proceeds to 408. Otherwise, the answer is no and method 400 proceeds to 412.

At 408, method 400 determines a propulsive effort request for a newly selected simulated transmission gear. Method 400 determines the propulsive effort request for a newly selected simulated transmission gear much in the same way that the propulsive effort request for the presently selected simulated transmission gear is determined, but method 400 references a table that outputs the propulsive effort request for the newly selected simulated transmission gear. For example, if the presently selected simulated transmission gear is second gear and the newly selected simulated transmission gear is third gear, method 400 determines the propulsive effort for the presently selected simulated transmission gear by referencing a table that outputs propulsive effort values for simulating engagement of second gear. Method 400 determines the propulsive effort for the newly selected simulated transmission gear by referencing a table that outputs propulsive effort values for simulating engagement of third tear. Method 400 proceeds to 410.

At 410, method 400 increases or decreases the propulsive effort request from the propulsive effort request of the presently engaged simulated gear to the propulsive effort request of the newly selected simulated gear. Method 400 may increase or decrease the propulsive effort request at a predetermined rate until the propulsive effort request is equal to the propulsive effort request for the newly engaged transmission gear. FIG. 5 shows an example sequence where the propulsive effort request is adjusted in this way. In one example, the propulsive effort request may be incrementally increased as discussed with regard to FIG. 3. By increasing or decreasing the propulsive effort request gradually, method 400 may ensure that a vehicle speed increase or decrease that is a result of a simulated gear shift may be within an expected speed range. For example, if the propulsive effort request for the presently engaged simulated transmission gear is 40 Newton-meters (Nm) and the propulsive effort request for the newly selected transmission gear is 50 Nm, method may increase the propulsive effort request from 40 Nm to 50 Nm at a rate of 2 Nm/second. Method 400 proceeds to 412.

At 412, method 400 judges if the propulsive effort request is greater than the monitor propulsive effort request by more than a predetermined amount or if propulsive effort request is less than the monitor propulsive effort request by more than a predetermined amount. For example, if the predetermined amount is 5 Nm and the propulsive effort request is 100 Nm and the monitor propulsive effort request is 98 Nm, then method 400 may judge that the propulsive effort request is not greater or less than the monitor propulsive effort request by more than the predetermined amount. However, if the predetermined amount is 5 Nm and the propulsive effort request is 100 Nm and the monitor propulsive effort request is 92 Nm, then method 400 may judge that the propulsive effort request is less than the monitor propulsive effort request by more than the predetermined amount. Likewise, if the predetermined amount is 5 Nm and the propulsive effort request is 100 Nm and the monitor propulsive effort request is 110 Nm, then method 400 may judge that the propulsive effort request is greater than the monitor propulsive effort request by more than the predetermined amount. If method 400 judges that the propulsive effort request is greater than or less than the monitor propulsive effort request by more than the predetermined amount, then the answer is yes and method 400 proceeds to 416. Otherwise, the answer is no and method 400 proceeds to 414.

At 414, method 400 commands the powertrain (e.g., the engine and electric machines) to provide torque or power that is equivalent to the propulsive effort request. Torque or power of the engine and the electric machine may be adjusted via one or more torque actuators (e.g., inverter, throttle, fuel injector, etc.). Method 400 proceeds to exit.

At 416, method 400 limits or constrains powertrain output power or torque to less than a predetermined amount. For example, if the propulsive effort request is 100 Nm, but the propulsive effort request is not in agreement with the monitor propulsive effort request, then the propulsive effort may be reduced to less than 5 Nm. In one example, the predetermined amount of torque that the propulsive effort request is limited to may be a creep torque for the vehicle. Method 400 proceeds to exit.

In this way, method 400 may control powertrain torque during a simulated gear shift. The powertrain torque may be gradually increased or decreased depending on the newly selected simulated transmission gear. Further, method 400 monitors the propulsive effort request during the simulated transmission gear shift so that vehicle speed increases or decreases may be within a desired range of speed increase or decrease.

The method of FIG. 4 provides for a method for operating a vehicle, comprising: simulating gear shifting of a step gear ratio transmission in a powertrain that includes a continuously variable transmission and that does not include stepped gear ratios; and adjusting a propulsive effort request to change from a first value to a second value via a plurality of incremental changes while a propulsive effort pedal position is substantially constant in response to the simulated gear shifting. The method further comprises comparing the propulsive effort request to a monitor propulsive effort request. The method further comprises limiting output of a powertrain in response to the comparing indicating that the propulsive effort request is out of an expected range. The method further comprises adjusting output of a powertrain to meet the propulsive effort request. The method includes where simulating gear shifting includes adjusting the propulsive effort request according to a plurality of maps. The method includes where the first value is smaller than the second value. The method includes where the first value is larger than the second value.

The method of FIG. 4 also provides for a method for operating a vehicle, comprising: simulating gear shifting of a step gear ratio transmission in a powertrain that includes a continuously variable transmission and that does not include stepped gear ratios via a controller in response to a position of a shift lever or input from a paddle shifter to the controller; adjusting a propulsive effort request to change from a first value to a second value via a plurality of incremental changes while a propulsive effort pedal position is substantially constant in response to the simulated gear shifting, where the first value is based on a simulated first gear, and where the second value is based on a simulated second gear; and generating a propulsive effort via a powertrain based on the propulsive effort request. The method includes where the simulated first gear is a gear with a higher ratio than the simulated second gear. The method includes where the simulated first gear is a gear with a lower ratio than the simulated second gear. The method further comprises comparing the propulsive effort request to a monitor propulsive effort request. The method further comprises limiting output of a powertrain in response to the comparing indicating that the propulsive effort request is out of an expected range. The method includes where the propulsive effort is a torque or power output.

Referring now to FIG. 5, an example prophetic vehicle operating sequence that shows powertrain torque management is shown. The sequence of FIG. 5 may be provided by the system of FIGS. 1 and 2 in cooperation with the method of FIG. 4. The plots of FIG. 5 are time aligned. Vertical lines at times t0-t2 show times of particular interest in the sequence.

The first plot from the top of FIG. 5 is a plot of propulsion effort pedal position versus time. The vertical axis represents the position of the propulsion effort pedal and the magnitude of the propulsion effort pedal position increases in the direction of the vertical axis arrow. The horizontal axis represents time and time increases from the left side of the figure to the right side of the figure. Trace 502 represents the propulsion effort pedal position.

The second plot from the top of FIG. 5 is a plot of simulated engaged transmission gear versus time. The vertical axis represents the simulated engaged transmission gear and the simulated engaged transmission gear numbers are display along vertical axis. The horizontal axis represents time and time increases from the left side of the figure to the right side of the figure. Trace 504 represents the simulated engaged transmission gear.

The third plot from the top of FIG. 5 is a plot of a propulsive effort request according to the method of FIG. 4 versus time. The vertical axis represents the propulsive effort request and the propulsive effort request increases in the direction of the vertical axis arrow. The horizontal axis represents time and time increases from the left side of the figure to the right side of the figure. Trace 506 represents the propulsive effort request.

The fourth plot from the top of FIG. 5 is a plot of a propulsive effort request according to the a prior art method versus time. The vertical axis represents the propulsive effort request and the propulsive effort request increases in the direction of the vertical axis arrow. The horizontal axis represents time and time increases from the left side of the figure to the right side of the figure. Trace 508 represents the propulsive effort request.

The fifth plot from the top of FIG. 5 is a plot of propulsion vehicle speed versus time. The vertical axis represents the vehicle speed and the magnitude of the vehicle speed increases in the direction of the vertical axis arrow. The horizontal axis represents time and time increases from the left side of the figure to the right side of the figure. Trace 510 represents the vehicle speed.

At time t0, the propulsive effort pedal position is zero and the simulated engaged gear is second gear. The propulsive effort request according to the method of FIG. 4 is zero and the propulsive effort request according to the prior art method is zero. The vehicle speed is less than 30 miles/hour.

Between time t0 and time t1, the propulsive effort pedal position increases and it levels off to a substantially constant value (e.g., the propulsive effort pedal position changes by less than 5% of full scale during a predetermined period of time, such as one second) before time t1. The simulated engaged gear remains second gear. The propulsive effort request according to the method of FIG. 4 increases and if follows the profile of the propulsive effort pedal position. Likewise, the propulsive effort request according to the prior art method increases and it follows the profile of the propulsive effort pedal position. The vehicle speed is shown exceeding 30 miles/hour.

At time t1, the propulsive effort pedal position remains substantially constant. The simulated engaged gear changes from second gear to third gear. The propulsive effort request according to the method of FIG. 4 begins to increase at a predetermined rate. Conversely, the propulsive effort request according to the prior art method is changed in a step-wise manner, which results in an abrupt change in the prior at propulsive effort request. The vehicle speed increases at an increased, but gradual rate since the powertrain output power or torque is commanded to follow the propulsive effort request according to the method of FIG. 4.

At time t2, the propulsive effort pedal position remains substantially constant. The simulated engaged gear remains in third gear. The propulsive effort request according to the method of FIG. 4 has reached the level of the propulsive effort request according to the prior art method. The propulsive effort request according to the prior art method is substantially unchanged. The vehicle speed increases at its prior rate.

In this way, torque output of a powertrain may follow a propulsive effort request that gradually changes between simulated transmission gear shifts so that vehicle speed may increase or decrease gradually. Accordingly, the vehicle's drivability may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
    simulating gear shifting of a step gear ratio transmission in a powertrain that includes a continuously variable transmission and that does not include stepped gear ratios;
    adjusting a propulsive effort request to change from a first value to a second value via a plurality of incremental changes while a propulsive effort pedal position is substantially constant in response to the simulated gear shifting; and
    comparing the propulsive effort request to a second propulsive effort request, the second propulsive effort request based on the propulsive effort pedal position and vehicle speed.

2. The method of claim 1, further comprising limiting a powertrain output in response to the propulsive effort request being less than the second propulsive effort request by more than a predetermined amount.

3. The method of claim 2, where the powertrain output is limited to a creep torque.

4. The method of claim 1, further comprising adjusting output of the powertrain to meet the propulsive effort request.

5. The method of claim 1, where simulating gear shifting includes adjusting the propulsive effort request according to a plurality of maps.

6. The method of claim 1, where the first value is smaller than the second value.

7. The method of claim 1, where the first value is larger than the second value.

8. A vehicle system, comprising:
    an engine;
    a continuously variable transmission coupled to the engine;
    a gear selector; and
    a controller with computer readable instructions stored on non-transitory memory that when executed cause the controller to:
        gradually change a propulsive effort request from a first value to a second value while a propulsive effort pedal position is substantially constant, the first value based on a powertrain simulating engagement of a first transmission gear, the second value based on the powertrain simulating engagement of a second transmission gear; and
        limiting output of a powertrain that includes the engine to less than a creep torque in response to a propulsive effort request being less than a second propulsive effort request by more than a predetermined amount.

9. The system of claim 8, where the first transmission gear is based on a position of the gear selector, and where the second transmission gear is based on the position of the gear selector.

10. The system of claim 8, where gradually changing the propulsive effort request includes increasing the propulsive effort request at less than a predetermined rate.

11. The system of claim 8, where gradually changing the propulsive effort request includes decreasing the propulsive effort request at less than a predetermined rate.

12. The system of claim 8, further comprising one or more paddle shift levers.

13. The system of claim 12, where the powertrain simulates shifting from the first transmission gear to the second transmission gear based on input to the one or more paddle shift levers.

14. The system of claim 8, where gradually changing the propulsive effort request includes incrementally adjusting the propulsive effort request.

15. A method for operating a vehicle, comprising:
simulating gear shifting of a step gear ratio transmission in a powertrain that includes a continuously variable transmission and that does not include stepped gear ratios via a controller in response to a position of a shift lever or input from a paddle shifter to the controller;
adjusting a propulsive effort request to change from a first value to a second value via a plurality of incremental changes while a propulsive effort pedal position is substantially constant in response to the simulated gear shifting, where the first value is based on a simulated first gear, and where the second value is based on a simulated second gear;
generating a propulsive effort via the powertrain based on the propulsive effort request; and
limiting output of the powertrain to less than a creep torque in response to the propulsive effort request being less than a second propulsive effort request by more than a predetermined amount.

16. The method of claim 15, where the simulated first gear is a gear with a higher ratio than the simulated second gear.

17. The method of claim 15, where the simulated first gear is a gear with a lower ratio than the simulated second gear.

18. The method of claim 15, further comprising limiting output of the powertrain in response to the propulsive effort request being greater than a second propulsive effort request by more than a predetermined amount.

19. The method of claim 15, where the propulsive effort is a torque or power output.

\* \* \* \* \*